UNITED STATES PATENT OFFICE.

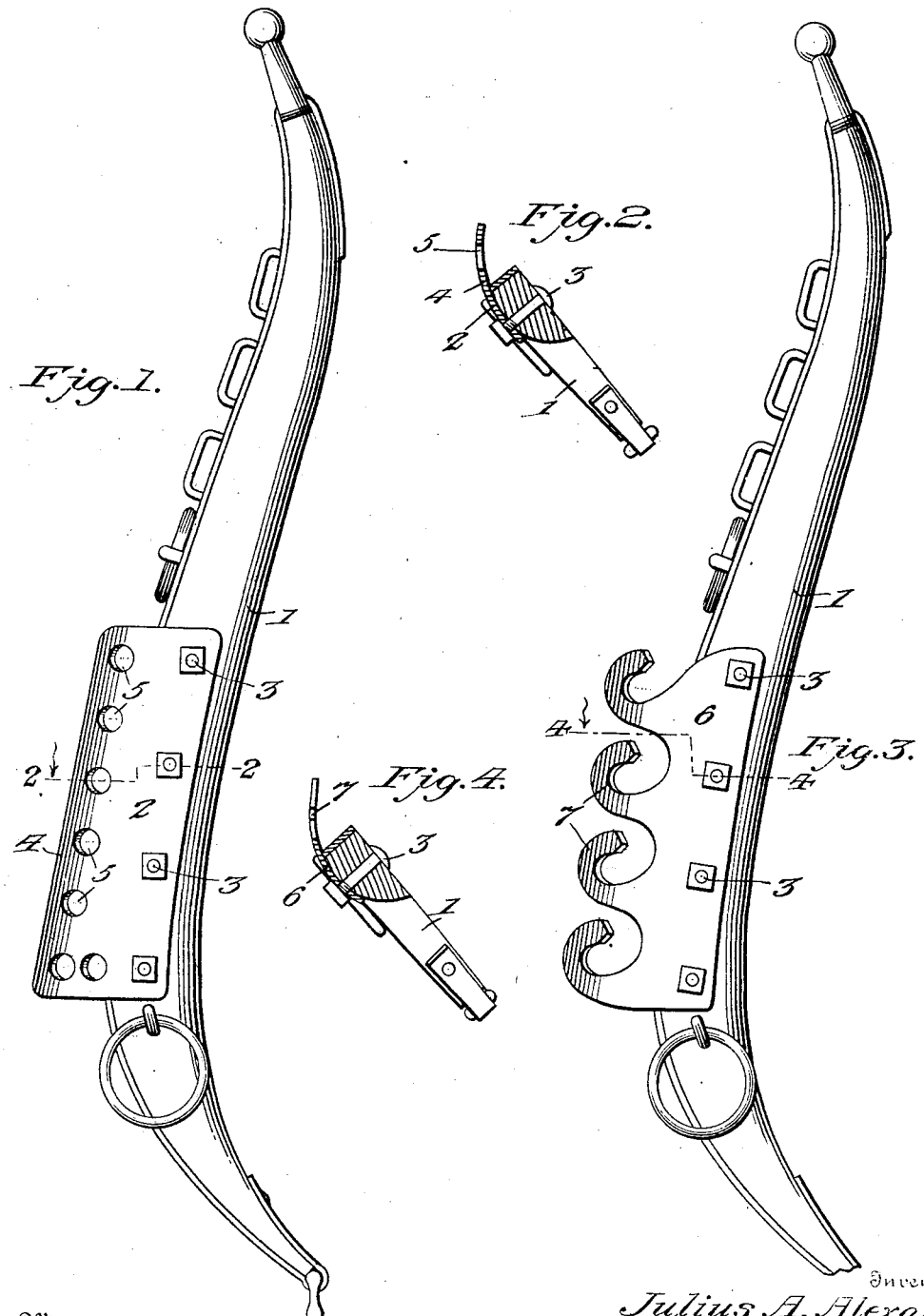

JULIUS A. ALEXANDER, OF PINE BLUFF, ARKANSAS.

HAME.

No. 810,383.     Specification of Letters Patent.     Patented Jan. 23, 1906.

Application filed May 2, 1903. Serial No. 155,330.

*To all whom it may concern:*

Be it known that I, JULIUS A. ALEXANDER, a citizen of the United States, residing at Pine Bluff, in the county of Jefferson and State of Arkansas, have invented new and useful Improvements in Hames, of which the following is a specification.

My invention relates to new and useful improvements in hames, and more especially to means for securing a tug or trace chain thereto; and its object is to provide securing means of this character by means of which said tug or trace chain can be adjustably attached to said hame in order to bring the draft at a desired point thereon.

A further object is to so construct the fastening means as to bring the line of draft directly in rear of the edges of the hame, and thereby prevent the hame from being pulled from the collar.

With the above and other objects in view the invention consists in the further novel construction and combination and arrangement of the several parts, which will be more fully hereinafter described and claimed, and illustrated in the accompanying drawings, in which—

Figure 1 is a front elevation of a hame constructed in accordance with my invention. Fig. 2 is a section on line 2 2, Fig. 1. Fig. 3 is a front elevation of a hame having a modified form of securing means, and Fig. 4 is a section on line 4 4, Fig. 3.

Referring to the figures by numerals of reference, 1 is a hame of ordinary construction, having a plate 2 secured to the front thereof by means of bolts 3 or in any other suitable manner. This plate is curved over the outer edge of the hame, as shown at 4, and adjacent to its outer edge is arranged a series of apertures 5, which are in alinement with each other, as shown in Fig. 1. Any one of these apertures is adapted to receive a snap-hook or other suitable device arranged at the end of a tug or trace chain. It will be seen that by providing a series of apertures 5 a tug or trace chain can be fastened at a suitable distance from the bottom of the hame and the line of draft therefore brought to any desired point, as that portion of the plate 2 provided with apertures 4 is curved over the edge of the hame, so as to extend beyond and in rear of the inner edge of the hame, which serves to throw the trace when connected therewith in easy line of draft with said hame, whereby the pull exerted thereupon will not be sufficient to remove the hame from the collar, as would be the case if the plate 2 extended straight from the side of the hame.

In Fig. 3 I have shown the hame provided with a plate 6, having a series of hooks 7 instead of apertures 4. This hooked edge of the plate is also curved over the side of the hame, as shown in Fig. 4. It will be seen that the device is extremely simple in construction, and, as before stated, by the use of this curved plate the hame will remain firmly seated within a collar when a pull is exerted thereupon.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus described the invention, what is claimed as new is—

A hame comprising an elongated trace-fastening plate having a series of vertically-arranged openings at one side thereof to register with similar openings in the hame, and bolts for securing the plate and hame together, the opposite side edge of the plate having a series of vertically-arranged hooks provided with inturned terminals, said plate being inwardly curved at its central portion to permit of one-half of its width to extend laterally beyond the inner edge of the hame, substantially as specified.

In testimony whereof I affix my signature in presence of two witnesses.

JULIUS A. ALEXANDER.

Witnesses:
   ROBERT C. ALEXANDER,
   E. F. PRICE.